United States Patent [19]

DePas et al.

[11] 3,982,623
[45] Sept. 28, 1976

[54] PICK OFF DEVICE

[75] Inventors: Laddie DePas; Stanley T. Wheeler, both of Louisville, Ky.

[73] Assignee: W. M. Cissell Manufacturing Company, Louisville, Ky.

[22] Filed: Dec. 11, 1975

[21] Appl. No.: 639,715

[52] U.S. Cl. ................................ 198/362; 198/657
[51] Int. Cl.² ........................................ B65G 47/36
[58] Field of Search ............ 198/28, 38, 177 R, 213, 198/27; 104/88, 130, 131, 167

[56] References Cited
UNITED STATES PATENTS

| | | | |
|---|---|---|---|
| 2,908,379 | 10/1959 | Hamilton | 198/177 R |
| 2,947,407 | 8/1960 | Wood | 198/28 X |
| 2,987,170 | 6/1961 | Hamilton | 198/213 |
| 3,231,072 | 1/1966 | Ohrnell | 198/213 |
| 3,247,952 | 4/1966 | Kozlosky | 198/188 X |
| 3,454,148 | 7/1969 | Harrison | 198/177 R X |
| 3,499,518 | 3/1970 | Goodpaster | 198/28 |
| 3,917,112 | 4/1975 | Willis et al. | 198/38 X |

FOREIGN PATENTS OR APPLICATIONS

| | | | |
|---|---|---|---|
| 1,408,277 | 7/1965 | France | 198/213 |
| 940,355 | 10/1963 | United Kingdom | 198/213 |

Primary Examiner—Evon C. Blunk
Assistant Examiner—Richard K. Thomson
Attorney, Agent, or Firm—Wood, Herron & Evans

[57] ABSTRACT

An improved pick off device adapted to transfer open mouth hook type work supports (e.g., hangers) from an extended length screw conveyor onto a branch support member (e.g., a slide rod), the support member branching off from the screw conveyor at an angle relative thereto. In preferred form, the improved device includes a helix concentrically fixed in place to the screw conveyor, the major diameter of the helix being substantially greater than the major diameter of the screw conveyor's threaded rod. A pick off finger is positioned generally longitudinally of the screw conveyor, and is positioned between the helix and the conveyor's threaded rod. The pick off finger is pivotally connected at one end to the branch support member, that pivotal connection permitting the finger's free tip to move between a pick off position where same is closely adjacent the surface of the conveyor's threaded rod and a pass-through position where same is elevated above that surface. When the pick off finger is in the pick-off position, work supports being conveyed along the screw conveyor are driven by the helix in a positive manner onto the pick off finger, and then onto the branch support member, thereby positively moving the work supports from the screw conveyor onto the support member. When the pick off finger is in the pass-through position, the work supports simply pass through the helix section of the screw conveyor without engaging the pick off fingers, thereby permitting the work supports to continue past the branch support member while remaining on the screw conveyor.

6 Claims, 14 Drawing Figures

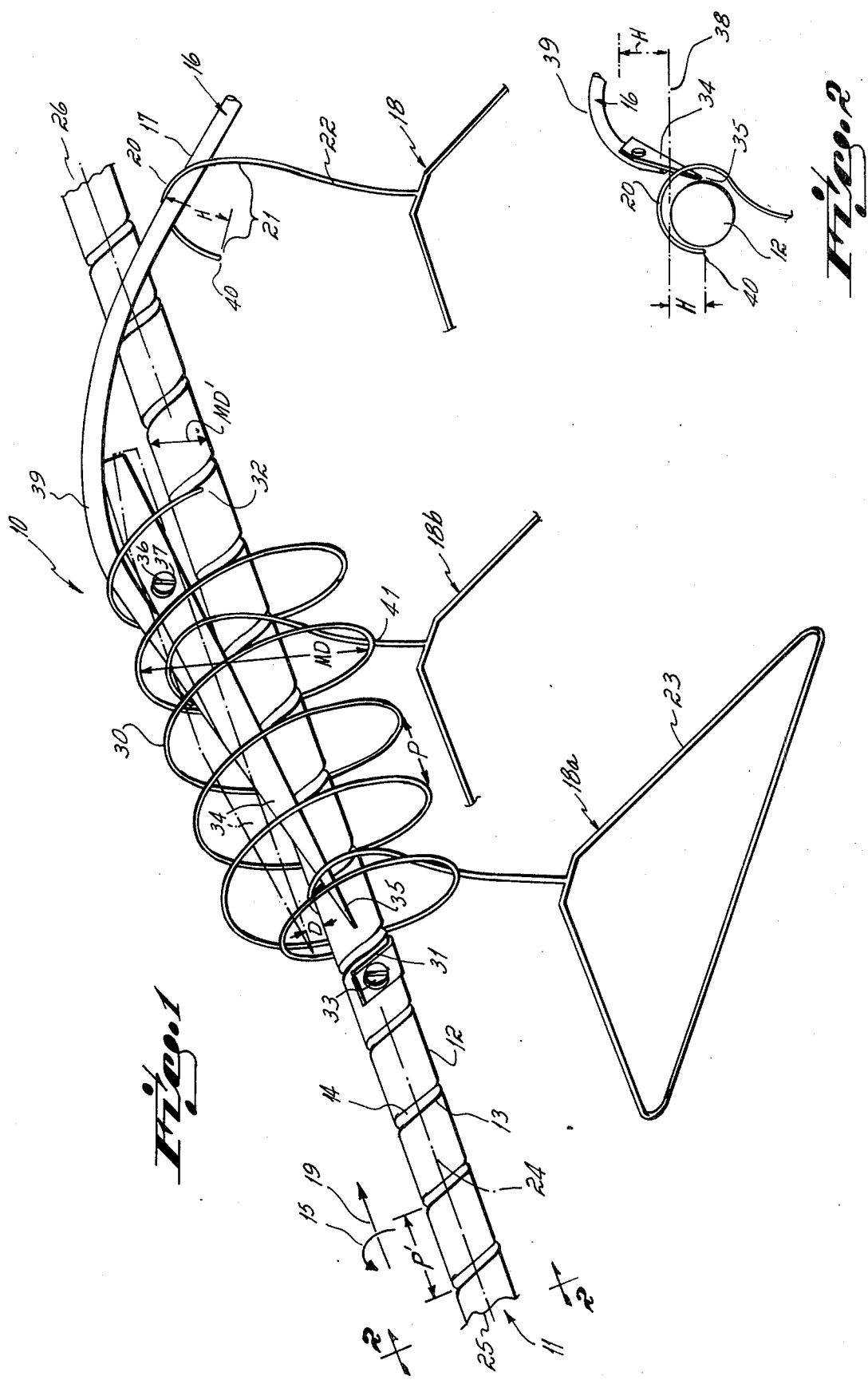

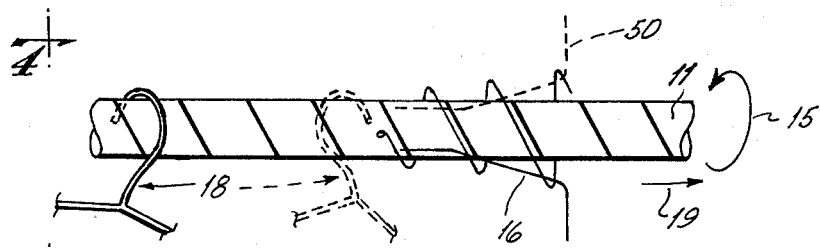
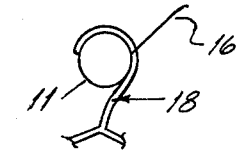
FIG.4
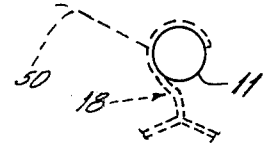
FIG.5
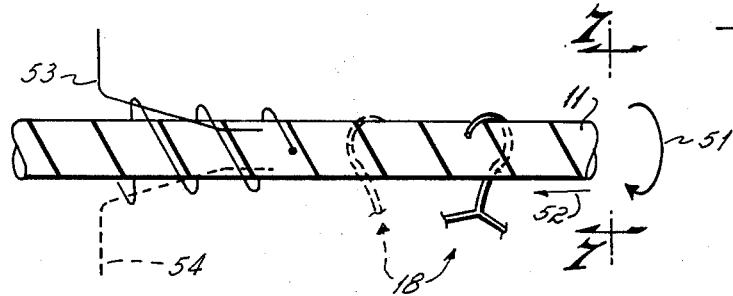
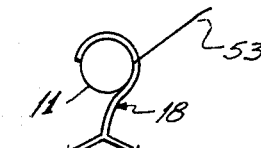
FIG.6
FIG.7
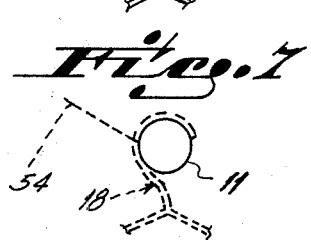
FIG.8
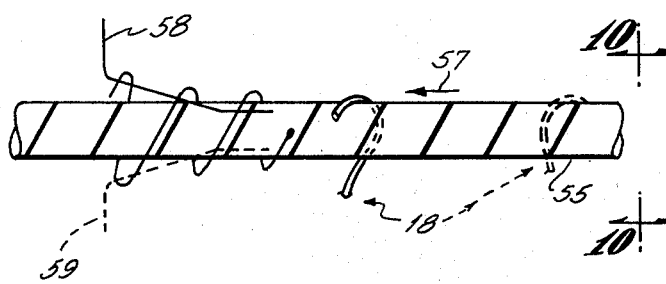
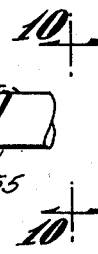
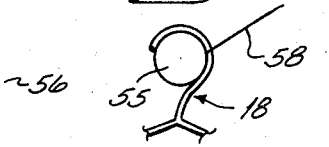
FIG.9
FIG.10
FIG.11
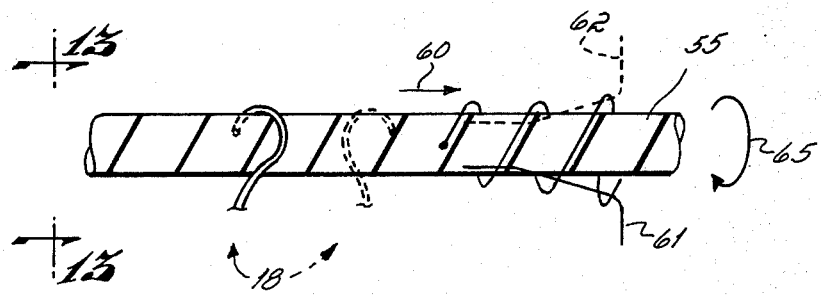
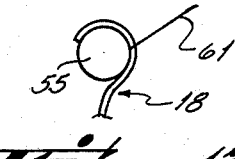
FIG.12
FIG.13
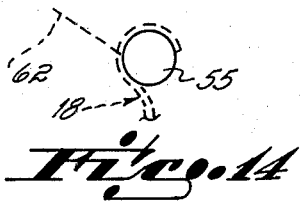
FIG.14

PICK OFF DEVICE

This invention relates to conveyors. More particularly, this invention relates to an improved pick off device for a screw conveyor.

Screw conveyors are commonly used in the dry cleaning industry to move hangers from one location to another. The conveyor itself may extend between successive stations within work processing or storage areas, and/or between a work processing area and a storage area. For example, a screw conveyor may be used to transfer garments on hangers from a dry cleaning station to a pressing station, or from a garment bagging station to a storage area, or the like, during the dry cleaning process. A screw conveyor of the type designed for use in the dry cleaning industry is in the nature of an extended length cylindrical rod having screw threads of relatively large pitch extending from one end to the other. Hangers, with or without garments hung thereon, are simply carried within the thread grooves defined on the exterior surface of the rod, the rod itself being rotated by suitable drive means in either the clockwise or counterclockwise direction. The rotational direction of the screw conveyor is, of course, dependent on whether the screw threads are of the right hand or left hand type, and on the direction of travel desired for the hangers carried on the conveyor.

It is known in the dry cleaning industry to interconnect a hanger pick off device with a screw conveyor of the type used to convey hangers from one loaction to another; such a device is illustrated in U.S. Pat. No. 3,231,072. The functional concept of a pick off device is useful to the dry cleaning industry because it may be desirable, under certain operational conditions, to mechanically remove or pick off hangers with clothes thereon at selected locations (e.g., at selected work stations within the clothes processing area, and/or at selected storage stations within the clothes storage area) between the ends of the screw conveyor.

However, there are a couple of disadvantages associated with the pick off device disclosed in U.S. Pat. No. 3,231,072, and there are a couple of potential problem areas which would no doubt arise upon use in a practical operating environment of the pick off device illustrated in that patent. First, the pick off arm associated with the screw conveyor shown in the patent reference must be spatially oriented on only one side of the screw conveyor. That side of the screw conveyor where the pick off arm is located must be that side which permits the frictional force generated between a hanger's hook and the conveyor's threaded rod to aid in transfer of the hanger from the conveyor onto the pick off arm. This limits the transfer or pick off direction of hangers from the conveyor to either the right or left, i.e., the hangers cannot be picked off both to the right and to the left. In other words, the pick off direction of the hangers is dependent upon the screw conveyor's rotational direction. Second, and because of the interdependency of the hanger's hook with the conveyor's threaded rod surface as is necessary to generate the frictional take-off force, the screw conveyor is no doubt limited to accomodating only certain types of hangers. In other words, the size and configuration of the hanger's hook, and also the cross-sectional size and configuration of the hanger's hook, must no doubt be carefully selected and controlled, in an effort to assure reliable operational success of the pick off device shown in the cited patent reference. Third, and importantly, the weight of the garment on the hanger would no doubt reflect on the operational success of the device shown in the cited patent reference. A heavy garment, such as a full length fur coat, on the hanger would no doubt be more difficult to pick off from the screw conveyor than would a light garment, such as a lightweight summer shirt. This for the reason, again, that the pick off device shown in the patent reference is dependent on the frictional force generated between the hanger's hook and the conveyor itself to aid in lifting the hanger hook off the screw conveyor.

Accordingly, it has been a primary objective of this invention to provide an improved pick off device structure for a screw conveyor adapted to convey open mouth hook type work supports (e.g., hangers) from one location to another, the pick off device driving the work support from the screw conveyor onto a branch support member (e.g., a slide rod) in a positive manner so that the work support is picked off the screw conveyor and placed on the branch support member with consistent regularity.

It has been another objective of this invention to provide an improved pick off device for a screw conveyor adapted to transfer open mouth hook type work supports (e.g., hangers) from one location to another, the pick off device being operable with any type open mouth hook used regardless of the hook's size or configuration, regardless of the cross-sectional configuration or size of the hook, and regardless of the weight of the workpiece (e.g., garment) carried on the work support.

It has been still a further objective of this invention to provide an improved pick off device for a screw conveyor adapted to transfer open mouth hook type work supports (e.g., hangers) from one location to another, the pick off device being operable to transfer work supports onto a branch support member which angles off to the right or off to the left of the screw conveyor (and whether a right hand or left hand thread is used on the screw conveyor) as long as the screw conveyor is rotated in that rotational direction necessary to provide the desired travel path direction for the hangers.

In accord with these objectives, this invention is directed to an improved pick off device adapted to transfer open mouth hook type work supports (e.g., hangers) from an extended length screw conveyor onto a branch support member (e.g., a slide rod), the support member branching off from the screw conveyor at an angle relative thereto. In preferred form, the improved device includes a helix concentrically fixed in place to the screw conveyor, the major diameter of the helix being substantially greater than the major diameter of the screw conveyor's threaded rod. A pick off finger is positioned generally longitudinally of the screw conveyor, and is positioned between the helix and the conveyor's threaded rod. The pick off finger is pivotally connected at one end to the branch support member, that pivotal connection permitting the finger's free tip to move between a pick off position where same is closely adjacent the surface of the conveyor's threaded rod and a pass-through position where same is elevated above that surface. When the pick off finger is in the pick-off position, work supports being conveyed along the screw conveyor are driven by the helix in a positive manner onto the pick off finger, and then onto the branch support member, thereby positively moving the work supports from the screw conveyor onto the support member. When the pick off finger is in the pass-through position, the work supports simply pass through the helix section of the screw conveyor without engaging the pick off fingers, thereby permitting the work supports to continue past the branch support member while remaining on the screw conveyor.

Other objectives and advantages of this invention will be more apparent from the following detailed description taken in conjunction with the drawings in which:

FIG. 1 is a detailed perspective view illustrating one embodiment of the improved pick off device of this invention;

FIG. 2 is a cross-sectional view taken along line 2—2 of FIG. 1;

FIG. 3 is a schematic top plan view of the improved pick off device of this invention illustrating a right hand thread screw conveyor rotating in a counterclockwise direction, a right hand pick off direction for a clothes hanger being illustrated by a hanger and pick off finger in solid lines, and a left hand pick off direction for a clothes hanger being illustrated by a hanger and pick off finger in phantom lines;

FIG. 4 is a cross-sectional view taken along line 4—4 of FIG. 3 illustrating the right hand pick off direction only;

FIG. 5 is a cross-sectional view similar to FIG. 4 illustrating the left hand pick off direction only;

FIG. 6 is a schematic top plan view similar to FIG. 3 but illustrating a right hand thread screw conveyor rotating in a clockwise direction, a right hand pick off direction for a clothes hanger being illustrated by a hanger and a pick off finger in solid lines, and a left hand pick off direction for a clothes hanger being illustrated by a hanger and pick off finger in phantom lines;

FIG. 7 is a cross-sectional view taken along line 7—7 of FIG. 6 showing the right hand pick off direction only;

FIG. 8 is a cross-sectional view similar to FIG. 7 illustrating the left hand pick off direction only;

FIG. 9 is a schematic top plan view similar to FIG. 3 but illustrating a left hand thread screw conveyor rotating in a counterclockwise direction, a right hand pick off direction for a clothes hanger being illustrated by a hanger and a pick off finger in solid lines, and a left hand pick off direction for a clothes hanger being illustrated by a hanger and a pick off finger in phantom lines;

FIG. 10 is a cross-sectional view taken along line 10—10 of FIG. 9 showing the right hand pick off direction only;

FIG. 11 is a cross-sectional view similar to FIG. 10 illustrating the left hand pick off direction only;

FIG. 12 is a schematic top plan view similar to FIG. 3 but illustrating a left hand thread screw conveyor rotating in a clockwise direction, a right hand pick off direction for a clothes hanger being illustrated by a hanger and a pick off finger in solid lines, and a left hand pick off direction for a clothes hanger being illustrated by a hanger and a pick off finger in phantom lines;

FIG. 13 is a cross-sectional view taken along line 13—13 of FIG. 12 showing the right hand pick off direction only; and FIG. 14 is a cross-sectional view similar to FIG. 13 but showing the left hand pick off direction only.

A preferred structural embodiment of the improved pick off device 10, in combination with a screw conveyor 11, is illustrated in FIGS. 1 and 2. As shown in those Figures, the screw conveyor 11 is in the nature of an extended length rod 12 bearing screw threads 13. The threaded rod 12, under normal use conditions, may extend between a plurality of work stations within, for example, a dry cleaning plant. The threaded rod 12, as shown, defines right hand threads 13 on the exterior surface, the threads having a substantial pitch P', i.e., the thread grooves 14 being substantially spaced one from the other along the length of the rod. A motor drive mechanism (not shown) is interconnected with the right hand thread screw conveyor to rotate same in a counterclockwise fashion as shown by rotational direction arrow 15.

Work supports 18, in the form of hangers, are carried on the screw conveyor 11, the work supports moving along a travel path indicated by direction arrow 19 when the right hand threaded rod 12 is rotated counterclockwise 15. Each work support or hanger 18 includes a hook 20 having an open mouth 21, the work support being hung on the screw conveyor 11 by the hook 20. Each hanger 18 is comprised of the usual hook portion 20, stem portion 22, and garment support or frame portion 23, the stem portion connecting the hook and the triangular frame. The hanger hook's mouth 21 must be of a width greater than the major diameter MD' of the threaded rod 12. However, the angle and depth of the rod's grooves 14 that define the threads 13 need only be such as to receive a hanger's hook 20 in frictional engagement therewith. Thus, and when a hanger's hook 20 is received in operational relation with the threaded rod 12 during counterclockwise 15 rotation of the right hand thread screw conveyor 11, the hanger 18 will move in a travel path indicated by directional arrow 19 along the axis 24 of the screw conveyor 11.

A branch support member in the form of a take off rod 16 is angularly disposed relative to the screw conveyor 11. This take off rod 16, commonly known as a slide rod because of its smooth top edge 17, is often used in the dry cleaning industry to receive hangers 18 removed from the screw conveyor 11 as same are being translated along the conveyor's length from one end 25 to the other 26 end. The improved pick off device 10 of this invention, in effect, interconnects the screw conveyor 11 and the take off or slide rod 16. Whether or not any hangers 18 are removed from the screw conveyor 11 onto the slide rod 16 depends on the operational attitude of the improved pick off device 10 as described in detail below. Although a slide rod 16 is shown, it will be understood to those skilled in the art that a screw or other type conveyor may be substituted therefor, such a conveyor also being known as a branch support member for purposes of description of this invention.

The improved pick off device 10 of this invention basically comprises a helix 30, e.g., of wire, fixed at its leading end 31 (relative to the directional flow 19 of hangers 18 on the conveyor 11) as by screws 33, to the screw conveyor's threaded rod 12. The helix 30 is concentrically disposed with respect to the threaded rod's axis 24, and the major diameter MD of the helix 30 is preferably substantially greater than the major diameter MD' of the threaded rod 12. Further, it is preferred that the pitch P of the helix 30 be approximately the same as the pitch P' of the threads 13 on the screw conveyor. The major diameter MD of the helix 30 must be such as to permit a pick off finger 34 to be interposed between that helix and the screw conveyor's threaded rod 12. The pick off finger 34 is in the nature of an elongated, substantially linear structural element that tapers to a tip 35 at its leading end (relative to the directional flow 19 of the hangers 18 on the conveyor 11). The pick off finger 34 is positioned to extend generally longitudinally of the conveyor's threaded rod 12 within the tubular spatial cavity defined by the exterior surface of the threaded rod and the helix.

The pick off finger 34 is pivotally connected, as at 36, to the slide rod 16 at a spatial location adjacent to the helix 30. The pivotal connection 36 of the pick off finger 34 with the slide rod 16 permits movement of the pick off finger between a phantom line or hanger pass-through position, and a solid line or hanger transfer position, all as shown in FIG. 1. In the hanger pass-through position, the elongated pick off finger 34 is oriented substantially parallel to the conveyor rod's axis 24, and is retained in that position by screw 37. The pivotal connection 36 of pick off finger 34 with slide rod 16 must be positioned such that the pick off finger will be spaced a distance D from the exterior surface of the threaded rod 12 sufficient to permit hangers 18 on that rod to pass beneath the finger 34 without being impeded in their progress along the directional path 19 from one end of the conveyor rod to the other, i.e., without being picked off onto slide rod 16. In the hanger 18 pick-off position, the pick off finger's tip 35 is juxtaposed to the surface of the threaded rod 12, and is restrained in that position by screw 37. The location of that juxtaposition between the pick off finger's tip 35 and the conveyor rod's exterior surface is such that the hanger's hook 20 will pass over the finger's tip and ride up onto the finger 34 as is illustrated by the hanger 18a sequence shown in FIG. 1.

The spatial orientation of the combined pick off finger 34 and the slide rod 16, vis-a-vis the conveyor's threaded rod 12, is important to insure reliable operation of the pick off device 10 when the finger 34 is in the hanger pick-off position. When in the hanger take-off position, the pick off finger 34 should angle upwardly relative to the threaded rod 12 from a position at which the finger's tip 35 is disposed beneath a horizontal plane 38 which is tangent to the top of the rod. This take-off position of the finger's tip 35 insures that a hanger's hook 20 will embrace both the finger and the rod when the finger is in the pick-off position, see FIG. 2. The pick off finger 34 and slide rod 16 structure preferably should also cooperate to define a hump 39 substantially above that horizontal plane 38, i.e., above the threaded rod 12, that hump 39 being upraised above the plane 38 a distance at least equal to the forehead height H of the hook 20, all as shown in FIG. 2. Such is preferable to permit the hanger hook's nose end 40 to clear the threaded rod 12 as the hanger 18 is lifted up relative to the threaded rod and onto the slide rod 16, all as illustrated in the hanger sequence shown in FIGS. 1 and 2. It is the helix 30 that, rotating with the threaded rod 12, cooperates with the hanger's stem 22, as at 41, to force the hanger up the pick off finger 34 over the hump 39 and onto the slide rod 16 once the hanger's hook 20 has left its conveying relationship with threads 13 on the threaded rod 12.

In use, and for the structural embodiment illustrated in FIGS. 1 and 2, the threaded screw conveyor 10 bears right hand threads 13 and is rotated counterclockwise 15 by drive means (not shown) so as to advance hangers 18 in accord with directional arrow 19 toward the helix 30 area. With the pick off finger 34 in the solid line position, and as hangers 18 advance from that portion of the threaded rod conveyor 11 upstream of the helix 30, each hanger's hook 20 is disposed over the tip 35 of the pick off finger 34 as each hanger moves into the helix area. The helix 30 picks up the hanger's stem 22, as at 41, as the hanger is conveyed into the helix area so as to continue pushing the hangers along the threaded rod 12 in accord with directional arrow 19, thereby continually pushing the hangers 18 in a positive manner up onto the pick off finger 34 after same have been removed from driving or conveying interengagement with the threaded rod 12 itself, compare the locations of hanger 18a with hanger 18b in FIG. 1. The helix 30 continues to positively drive successive hangers 18 up onto and along the pick off finger 34 until same pass over the pick off device's hump 39 at which point the hangers have been lifted off the threaded rod 12 a distance that permits same to be branched off or directed off onto slide rod 16. The slide rod 16 may be angulated slightly downward from the hump 39 (and relative to horizontal) so that a gravity assist is provided the hangers 18 in moving away from the screw conveyor 11 along the slide rod 16. Of course, the rod 16 may extend horizontally outward from the hump 39 if desired, the hangers then being moved along the slide rod and away from the conveyor 11 by hand.

Alternatively, and when it is not desired to pick off hangers 18 from the screw conveyor 11 onto the slide rod 16, the pick off finger 34 is moved from the solid line position to the phantom line position of FIG. 1. In this operational attitude, and although the helix 30 may engage the hanger's stems 22, as at 41, as the hangers pass from upstream of the helix into and through the helix area, the hanger is simply positively driven through the pick off device 10 from the upstream end 31 to the downstream end 32 thereof. This positive drive is maintained by the threads on the threaded rod 12, and may be aided or not by the helix 30. The important point here is that the pick off finger 34, having been disposed substantially parallel to and spaced above the screw conveyor 11 when in the phantom line position, is no longer accessible to the hangers and the hanger's hooks 20 cannot ride up thereon. Hence, the hangers 18 simply pass from the upstream end of the screw conveyor 11 through the pick off device 10 and into the downstream end of the screw conveyor.

When the pick off finger 34 is disposed in the pick off attitude shown in solid lines in FIG. 1, it will be apparent, and as was previously mentioned, that the hangers are positively driven by the helix 30 up the pick off finger 34 over the hump 39 and onto the slide rod 16. This positive driving force application on the hangers, through contact of the helix with the hangers' stems 22, as at 41, insures that the hangers 18 will be transferred from the screw conveyor 11 onto the slide rod 16 regardless of the weight of the garments (not shown) on the hangers, and regardless of the configuration or size of the hangers' hooks 20. It is important to note that the transfer of the hangers 18 from the screw conveyor 11 onto the slide rod 16 does not depend in any manner upon frictional force developed between a hanger's hook 20 and the screw conveyor's threaded rod 12 itself. Hence, the hangers 18 can be transferred onto a slide rod 16 that branches off directly either to the right or to the left (relative to the hanger flow direction 19) of the screw conveyor 11 itself.

A number of different embodiments of the improved pick off device 10 of this invention are structurally compatible with the principles of this invention. The structural principles of this invention are primarily related to whether the screw conveyor 11 is provided with right hand or left hand screw threads 13, and whether the screw conveyor 11 is rotated clockwise or counterclockwise. FIGS. 3–8 illustrate those structural embodiments of this invention where the screw conveyor uses right hand threads, and FIGS. 9–14 illustrate those structural embodiments of this invention where the screw conveyor uses left hand threads. FIGS. 3–5 illustrate those structural embodiments of the improved pick off device where the right hand thread screw conveyor is rotated counterclockwise, and FIGS. 6–8 illustrate those structural embodiments of the improved pick off device where the right hand thread screw conveyor is rotated clockwise. FIGS. 9–11 illustrate those structural embodiments where the left hand thread screw conveyor is rotated counterclockwise, and FIGS. 12–14 illustrate those structural embodiments where the left hand thread screw conveyor is rotated clockwise.

As shown in FIGS. 3–5, a screw conveyor 11 with right hand threads that is rotated counterclockwise produces a hanger 18 travel path direction indicated by directional arrow 19. With this screw conveyor 11 setup, the hangers 18 may be taken off either to the right or to the left (relative to the travel direction of the hangers) of the screw conveyor at an angle relative thereto by the improved pick off device of this invention. The solid line illustration of the slide rod 16 and hanger hook 20 shown in FIG. 3 indicated a transferring off of hangers from the screw conveyor 11 to the right, and this schematic illustration of the pick off device 10 is that shown in structural detail in FIGS. 1 and 2. Note particularly that when the hangers 18 are to be taken off to the right on a slide rod 16, the hooks 20 of the hangers 18 must be disposed on the screw conveyor so that the hangers' hooks 20 open to the left of the conveyor, see FIG. 4. When it is desired to pick off the hangers 18 and direct same to the left of the screw conveyor 11 on slide rod 50 as shown in phantom lines in FIGS. 3 and 5, the hangers 18 must be disposed so that the hooks 20 open to the right of the screw conveyor. As a general rule, therefore, and with reference to the travel direction 19 of the hangers 18 on the screw conveyor 11, the hangers must be disposed on the screw conveyor so that mouths 21 of the hooks 20 open toward that direction opposite to the takeoff direction (right or left) from which the slide rod 16 or 50 branches off the screw conveyor 11.

FIGS. 6–8 schematically illustrate a screw conveyor 11 having right hand threads 13 but rotated in a clockwise direction 51 so as to move hangers 18 on the screw conveyor in accord with the directional arrow 52 illustrated in FIG. 6. As was the case with the right hand screw thread conveyor 11 embodiment shown in FIGS. 3–5, the hangers 18 must be disposed on the screw conveyor so that same can be lifted off toward that side of the conveyor (relative to the directional path 52 of the hangers) from which the slide rod 53 or 54 extends away from the conveyor. FIGS. 6 and 7 show a right hand slide rod 53 take off in solid lines, and FIGS. 6 and 8 show a left hand slide rod 54 take off in phantom lines.

FIGS. 9–11 illustrate a left hand screw conveyor 55 rotating in the counterclockwise direction 56. As shown in those Figures, hangers on left hand screw conveyor 55 travel in a path indicated by directional arrow 57 when the screw conveyor is rotated counterclockwise 56. In this structural environment, and when it is desired to take a hanger off to the right of the screw conveyor along slide rod 58, the hanger 18 must be disposed on the screw conveyor 55 so that the hook can be lifted off to the right of the conveyor rod, see solid lines of FIGS. 9 and 10. Likewise, and when it is desired to take the hangers 18 on the conveyor rod 55 off to the left of the screw conveyor onto slide rod 59, the hangers 18 must be disposed so that the hooks open to the right as shown in phantom lines in FIGS. 9 and 11.

FIGS. 12–14 depict a left hand screw conveyor 55 rotating in a clockwise direction 65, hangers 18 being directed along the conveyor in the directional path indicated by directional arrow 60. As was the case with the above described structural embodiments, when it is desired to pick off a hanger 18 from the screw conveyor 55 to the right so as to direct same onto a right hand slide rod 61, same is hung on the conveyor so that the hanger hook's mouth opens to the left as shown in solid lines in FIGS. 12 and 13. When it is desired to lift a hanger 18 off the screw conveyor 55 so as to direct same onto a left hand slide rod 62, same is disposed on the conveyor as shown in phantom lines in FIGS. 12 and 14.

Having described in detail the preferred embodiment of my invention, what I desire to claim and protect by Letters Patent is:

1. An improved pick off device adapted to transfer open mouth hook type work supports from an extended length screw conveyor onto a branch support member, said support member branching off from said screw conveyor at an angle relative thereto, said device comprising:
   a helix surrounding and spaced from said screw conveyor's threaded rod, said helix being fixed in place on said threaded rod for rotation therewith, and
   a pick off finger positioned generally longitudinally of said screw conveyor between said helix and said threaded rod, said pick off finger being connected at one end to said branch support member and said finger's tip being closely adjacent the surface of said threaded rod at the other end, said work supports being driven in a positive manner by said helix up onto said pick off finger for transferring same from said screw conveyor onto said branch support member upon rotation of said screw conveyor.

2. An improved pick off device as set forth in claim 1, said pick off finger being pivotally connected at said one end to said branch support member, said pivotal connection permitting said finger's tip to move between a pick off position where same is closely adjacent the surface of said threaded rod and a pass-through position where same is elevated above said threaded rod's surface, said work supports being driven in a positive manner by said helix up onto said pick off finger for moving same from said screw conveyor onto said branch support member when said pick off finger is in the pick-off position upon rotation of said screw conveyor and said work supports passing through said helix section of said screw conveyor to continue on said screw conveyor beyond said branch support member when said pick off finger is in the pass-through position upon rotation of said screw conveyor.

3. An improved pick off device as set forth in claim 1, said helix being concentrically disposed relative to said threaded rod's axis, and the difference in the major diameter of said helix and said threaded rod being at least about equal to the nose height of said work support's open mouth hook.

4. An improved pick off device as set forth in claim 2 wherein said pick off finger's tip is disposed beneath a horizontal plane that is tangent to the top of said threaded rod when said pick off finger is in the pick-off position.

5. An improved pick off device as set forth in claim 2, at least one of said pick off finger and said branch support member defining a hump positioned to cooperate with said helix, and said hump being disposed above a horizontal plane that is tangent to the top of said threaded rod, and said hump being disposed above said plane a distance about equal to the nose height of said work support's open mouth hook, thereby insuring that said work supports will be lifted off said screw conveyor when said pick off finger is in the pick-off position.

6. An improved pick off device as set forth in claim 1 wherein said work support is a garment hanger and said branch support member is a slide rod.

* * * * *